INVENTORS
Hubert E. Magee
Joseph C. Whitmer

Their Attorney

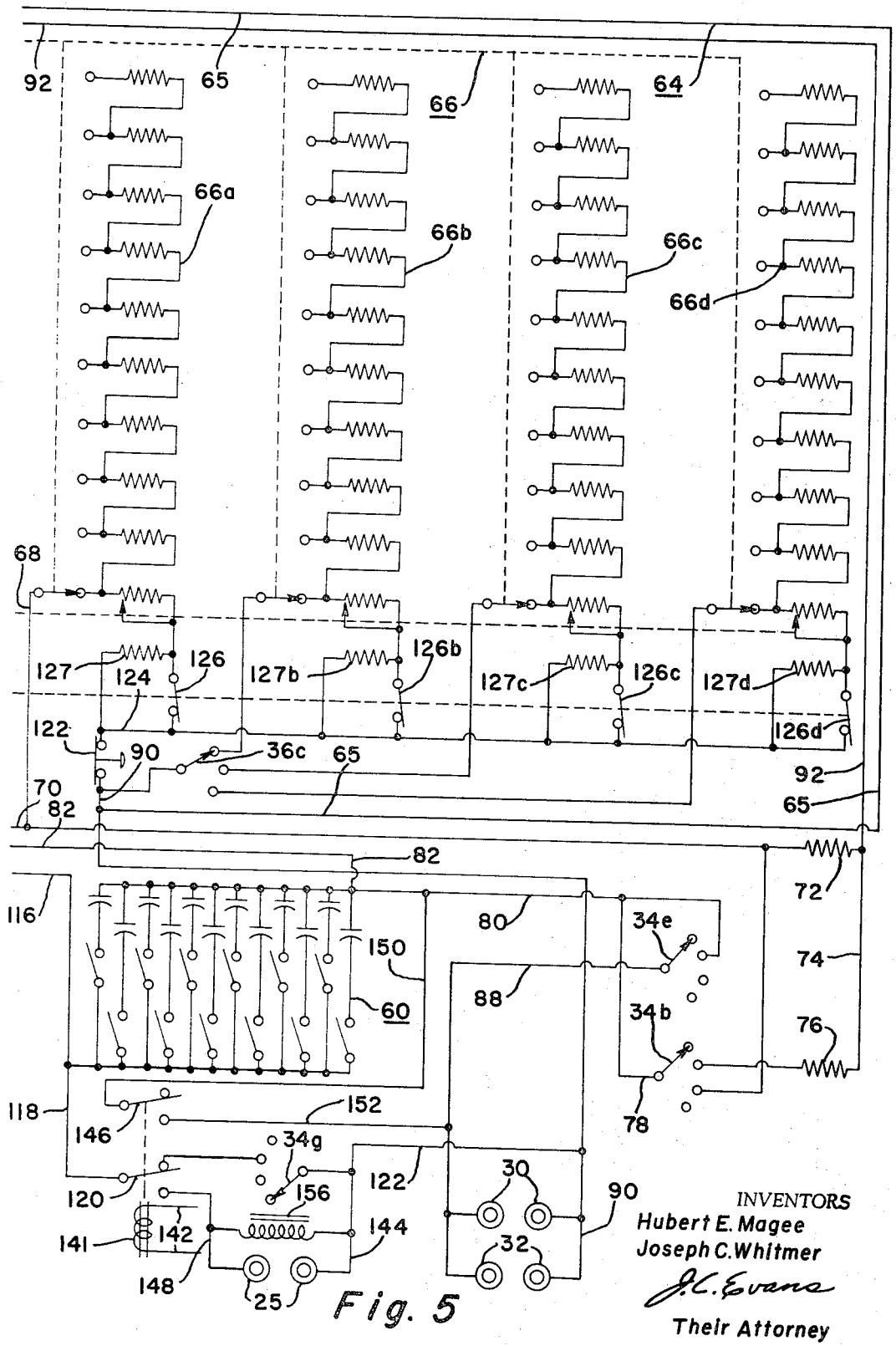

United States Patent Office 3,406,335
Patented Oct. 15, 1968

3,406,335
APPARATUS FOR RECORDING TEMPERATURE CHANGES IN A RESISTIVE ELEMENT DUE TO SELF-HEATING
Hubert E. Magee, Dayton, and Joseph C. Whitmer, Bradford, Ohio, assignors to General Motors Corporation, Detroit, Mich., a corporation of Delaware
Filed Mar. 30, 1965, Ser. No. 443,935
7 Claims. (Cl. 324—65)

ABSTRACT OF THE DISCLOSURE

In preferred form, an electrical resistance measuring system for continuously recording changes in temperature of wiring in electrical components under operating conditions. The system includes a first circuit for measuring ambient resistance of the component. The first circuit is associated with means to energize the component across an AC power source. A DC sensing circuit produces a signal reflecting changes in temperature in the tested component under operating conditions. The DC sensing circuit is automatically matched to a particular kind of load to produce a maximum output signal differential to fully utilize the scale of a continuously reading null balance temperature recorder.

---

This invention relates to temperature recorders and more particularly to a load calibrating and testing meter for indicating the temperature rise of an operating electrical load in response to resistance changes therein.

In the design of electrical equipment and in particular domestic appliances, there is an Underwriters Laboratory requirement that the temperature increase of electrical loads in the equipment be maintained within predetermined limits. Thus, it is necessary to obtain accurate and reliable temperature data of the wiring in electrical components under their operating conditions. One approach to obtaining such data has been to continually balance a Wheatstone bridge to determine resistance change in the electrical component being checked. Delay in balancing such systems causes transient conditions to go undetected. The test results, therefore, are at times unreliable.

An object of the present invention is to improve temperature testing of wiring in electrical components by means of a combination DC testing circuit and AC power circuit for the components wherein common circuit means are present for calibrating the system for a particular type of equipment to be tested and for continuously producing an output signal of changes in the resistance of the wiring produced by self-heating.

Another object of the present invention is to improve temperature testing of the wiring in electrical components by the provision of a meter having a DC testing circuit and an AC power circuit and means for controlling the range of the output signal of the DC testing circuit in accordance with the type of load being tested to fully utilize the recording scale of an associated recorder that indicates the output signal continuously on an advancing recording graph.

Another object of the present invention is to improve the testing of temperature increase of an electrical wire in an electrical component by the provision of a DC testing circuit that is automatically calibrated to a particular load being tested and conditioned thereby to establish a base or lower output signal and wherein the testing circuit further includes means for establishing an upper output signal to utilize the full recording scale of a continuous recording instrument receiving the output signal.

Still another object of the present invention is to improve temperature testing of wiring in an electrical component by means of an electrical meter having a DC testing circuit and an AC power circuit for energizing the load to be tested and wherein the DC testing circuit includes first means for obtaining the ambient resistance value of the load being tested and second means responsive to said first means for conditioning said testing circuit to obtain a base or lower output signal therefrom and wherein additional means are provided in the DC circuit for obtaining an upper limit of the output signal from the testing circuit to utilize the full recording scale of a continuous recording instrument receiving the output signal.

Still another object of the present invention is to improve the thermal testing of electrical equipment by measuring changes of resistance of the wiring therein by the provision of a current metering device having AC power circuit for energizing the load to be tested and a DC testing circuit for sensing resistance changes therein and producing an output signal receivable by a continuous recording device and wherein the testing circuit includes first means for establishing the resistance of the load at ambient conditions, second means responsive to said first means for establishing a base limit on the output signal correlated to the load and third means adjustable for establishing an upper output signal limit to fully utilize the recording range of the associated recorder whereby changes in resistance of the load produced by temperature increases therein during its operation will be continuously fully recorded across substantially the full scale of the recorder.

Still another object of the present invention is to improve the temperature testing of electrical wiring in electrical components by the provision of a signal producing device having an AC power circuit for the load to be tested and a DC testing circuit for producing a signal in response to resistance changes in the load caused by temperature increases thereof wherein the DC testing circuit includes a bridge circuit having adjustable means therein for establishing the resistance of the load under ambient conditions, a resistance multiplier responsive to adjustment of the calibrating bridge circuit to condition the testing circuit to have a predetermined output signal and a voltage divider circuit and a buck biasing circuit operatively associated with the multiplier unit for establishing the upper and lower limits of the output signal whereby the output signal will be related to the scale of a recording device so that it will continuously indicate the resistance changes in the load being tested throughout its full recording scale.

Further objects and advantages of the present invention will be apparent from the following description, reference being had to the accompanying drawings wherein preferred embodiments of the present invention are clearly shown.

In the drawings:

FIGURE 5 is a detailed electrical circuit diagram of the remainder of the testing equipment of the present invention.

Figure 1:
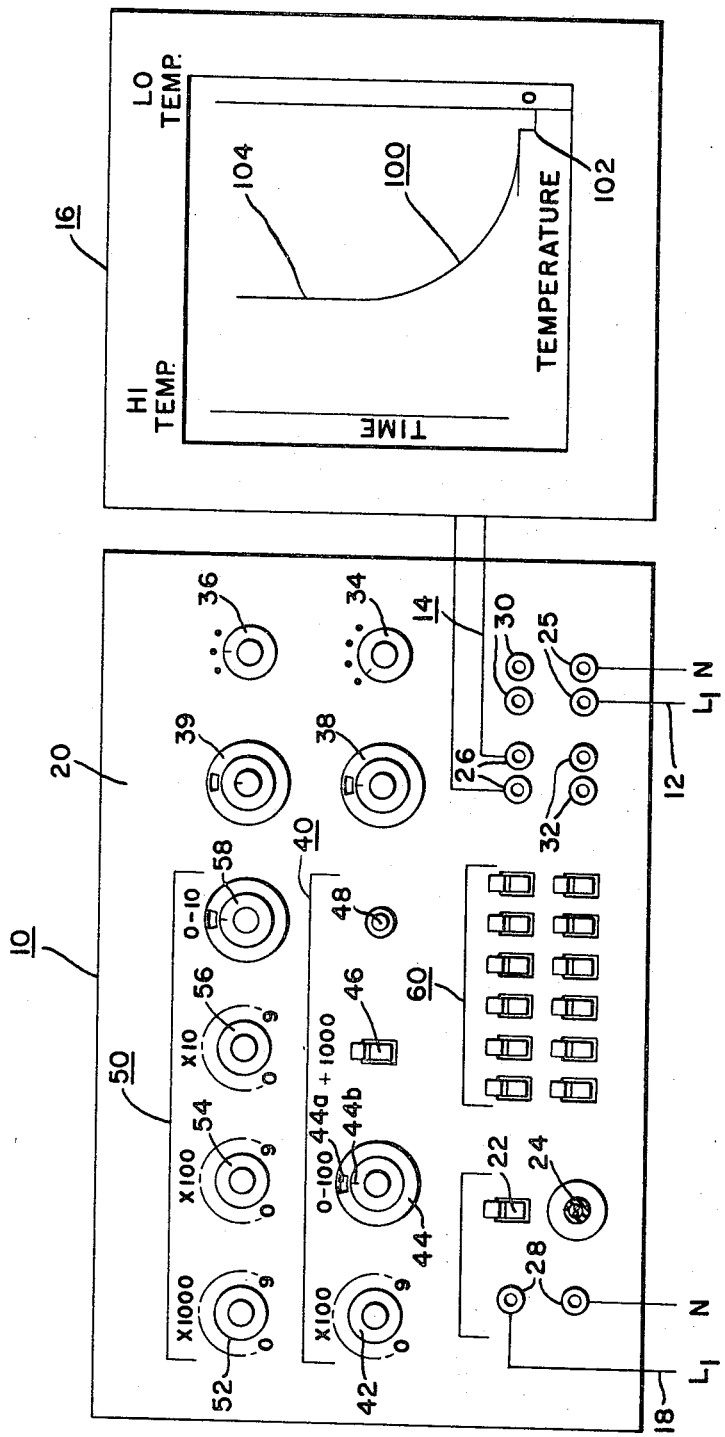
FIGURE 1 is a view in front elevation of a control console of the testing equipment of the present invention.

Referring now to FIGURE 1, a testing meter 10 is shown having a power supply circuit 12 thereto represented by lines $L_1$–N of a typical three-wire, 110-volt residential power circuit. From the meter 10 a signal output circuit 14 is shown connected to a null balance recorder unit 16 having a power supply circuit 18 thereto off lines $L_1$ and N.

The meter 10 includes a control console 20 shown in

FIGURE 1 as including a switch 22 for controlling power supply through a plug 24 connectible to the recorder. On the console lines $L_1$–N to the meter 10 and recorder 16 connect to input jacks 25, 28, respectively. The console also includes output signal jacks 26 for connecting the meter 10 to the circuit 14 to the recorder 16 and a pair of jacks 30 for connecting a volt meter or other suitable testing device to read out the load voltage. Additionally, the console includes a pair of inlet jacks 32 for connecting the load into the meter 10.

In order to control the sequence of operation of the meter 10, a function selector switch 34 is provided on the console 20 to selectively carry out bridge, calibrating or operating steps of testing. Additionally, the console includes a temperature scale knob 36 to condition the meter 10 for testing loads operating through various temperature ranges. Associated with the function switch 34 is a bridge sensitivity knob 38 that is used to finely adjust the output signal from a bridge circuit to be discussed and a zero adjust switch 39 for modulating the output signal from a testing circuit.

Additionally, the console includes a bank 40 of control knobs 42, 44, 46 and 48 for conditioning the output signal from the meter with respect to the load being tested for establishing a base or lower end of the scale of the recorder 16.

The console 20 also includes a full-scale adjustment 50 having adjustable control knobs 52, 54, 56, 58 thereon for adjusting the output signal range between a base limit and a maximum value for fully utilizing the read out scale of the recorder 16. The console 20 further includes a bank 60 of capacitor switches operative to include capacitors in the testing circuit to by-pass alternating current and thereby isolate the DC testing components from the AC power circuit.

The above-described console is suitable for testing a wide range of electrical components under actual electrical operating conditions. For example, it can be used to check the temperature increase in solenoid valves used in washing machines, the temperature increase in wiring of an electrical motor used in domestic appliances, or other like loads which must pass Underwriters Laboratory temperature increase requirements. While the operation of the testing meter 10 will be discussed with respect to a testing procedure suited in particular for the Underwriters Laboratory, it is equally suited for use in determining temperature increase in the wiring of electrical components for other purposes such as determining the minimum amount of coil winding needed for efficient motor operation.

Figure 3:
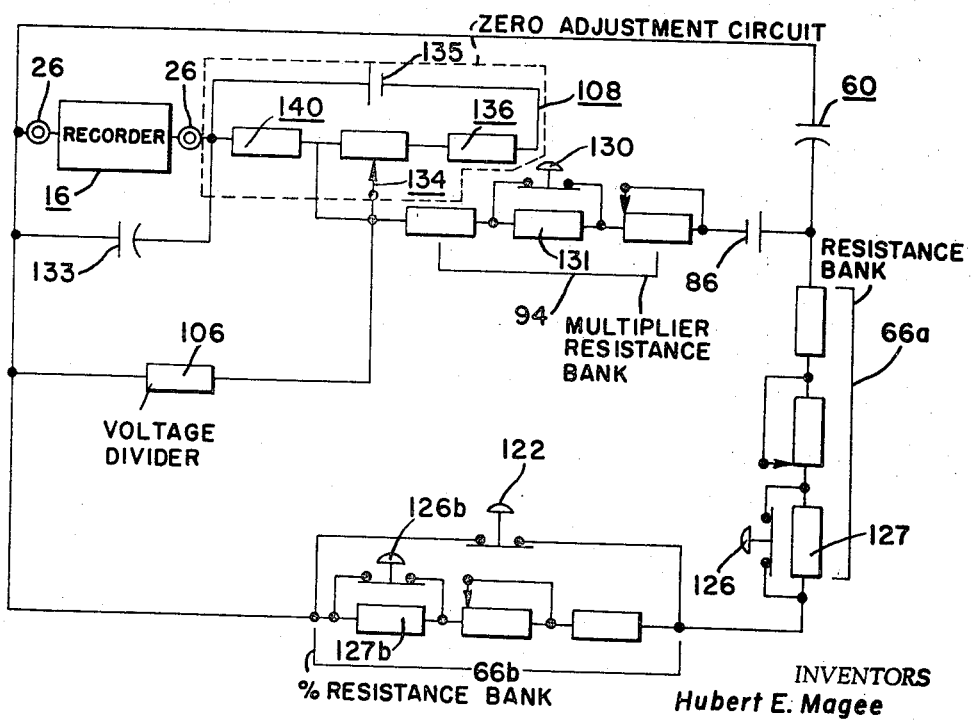
FIGURE 3 is a block diagram of a calibration circuit of the present invention.
Figure 4:
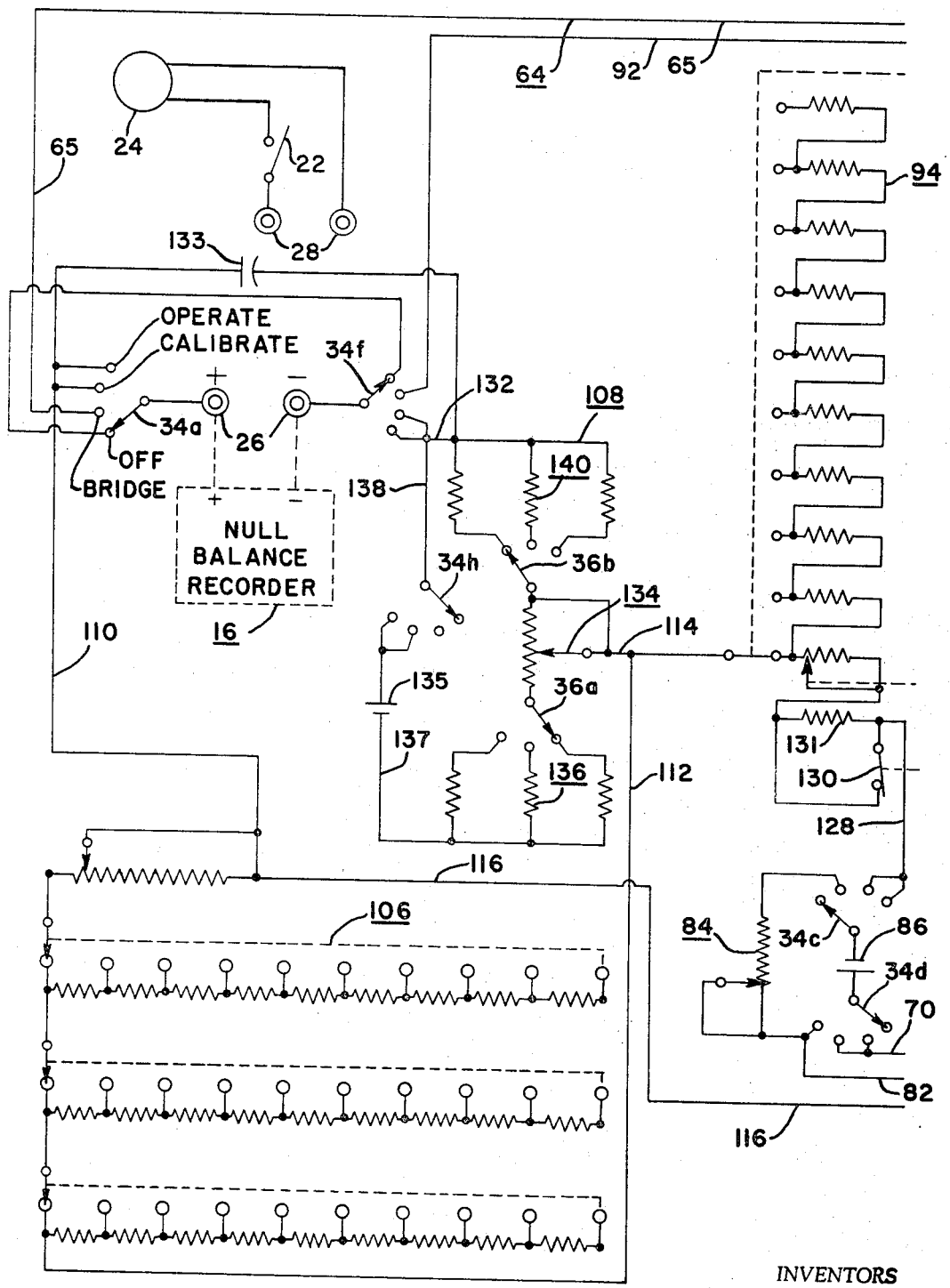
FIGURE 4 is a detailed electrical circuit diagram of part of the temperature testing equipment of the present invention.

In FIGURES 3, 4 and 5 a circuit diagram 64 of the meter 10 is shown conditioned to an "off" position. To test a particular load, for example, a solenoid valve for a domestic washing machine, the wiring of the valve is connected across the input jacks 32 and the console is connected to a suitable source of power through the input terminals or jacks 25 seen in the circuit diagram 64 in FIGURE 5. Additionally, the power supply for the recorder 16 is connected to the input terminals 28 as seen in FIGURE 4.

Figure 2:
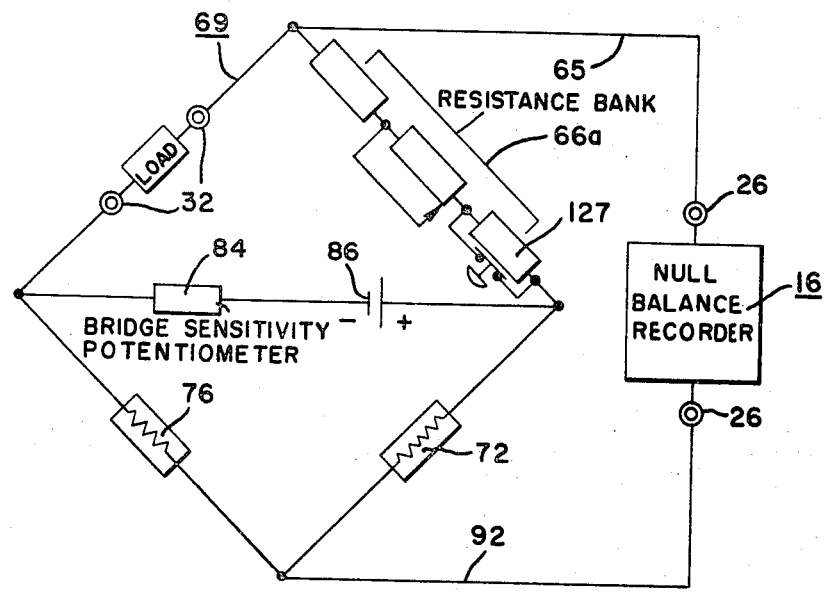
FIGURE 2 is a block diagram of a resistance check bridge in the present invention.

The next step in a typical testing procedure is to determine the resistance of the load across the input jacks 32 at ambient conditions. To effect this operation, the function switch 34 is moved to a bridge testing position. When the switch 34 is at this position, the load across the input jacks 30 is included in a bridge circuit having its output terminals connected by the circuit 14 to the recorder 16 which is used as a means for determining when the load is balanced against an equivalent comparative resistance. More particularly, when the switch 34 is moved to its bridge position, a single pole, plural throw switching component 34a thereof is located to connect the positive output signal jack 26 to a conductor 65 which is connected to one side of a bank of resistances 66 connected at the other side thereof to a conductor 68 wherein the resistance bank 66a forms one leg of a resistance testing bridge 69 as best seen in FIGURE 2. The conductor 68 connects to a conductor 70 having a resistance 72 therein forming another of the bridge legs which, in turn, is connected to a conductor 74 having a resistance 76 therein forming still another of the legs of the testing bridge circuit. The conductor 74 is connected to a single pole, plural throw switching component 34b of the function switch 34 which is best seen in FIGURE 5 to connect resistance 76 to a conductor 78, a conductor 80 and a conductor 82 through a bridge sensitivity potentiometer 84 (in FIGURE 4) and thence through another single pole component 34c of the function switch 34 through a source of DC power 86 thence through yet another single pole, multiple throw component 34d of the function switch back to a junction between conductors 68 and 70.

The remaining leg of the bridge circuit includes the load across the input jacks 32 and is completed in the circuit 64 of FIGURES 4 and 5 from the junction between the conductors 78 and 80 through a single pole, multiple throw switching component 34e of the function switch thence through a conductor 88 to one side of the load and through a conductor 90 on the other side thereof which is connected to the junction between the conductor 64 from the recorder and the resistance bank 66. The signal output from the bridge to the recorder circuit is completed through a conductor 92 running from the junction between the legs including resistances 72 and 76 back to the negative jack of the output signal jacks 28 through a single pole, multiple throw switching component 34f of the function switch 34.

By virtue of the above-described circuit, best seen in block diagram form in FIGURE 2, the ambient resistance of the load across jacks 30 can be accurately determined by adjustment of the resistance bank 66 in the following manner. First a one hundred percent decade of resistance 66a are adjusted by switches 42 and 44 on the console 20 to obtain a balance on the output signal to the recorder 16. The switch 44 is shown as being of a type that includes first indicia 44a which is a fraction of the value of each of the resistance elements in the decade 66a and indicia 44b which is a fraction of the indicia 44a. Thus, from the switches 42 and 44 an accurate read out of the resistance value that balances against the load across jacks 32 is obtained. Resistance decades 66b, 66c and 66d of bank 66 are directly ganged to the decade 66a wherein a simultaneous adjustment of these portions of the resistance bank 66 will be obtained to produce predetermined percentages of the resistance of decade 66a, for example, 80%, 40% and 20% resistance values of the decade 66a for use in predetermined resistance versus temperature testing operations on the load across the input jacks 32 as will be discussed.

Additionally, another multiplier decade or bank of resistances 94 is also ganged to the bank 66a whereby the resistance checking of the load will establish a predetermined resistance that is of a particular multiple of the resistance in the bank 66a for use in the testing operation as will be discussed.

While the resistance checking operation has been discussed with reference to checking the resistance of one particular load, this step of the testing procedure can be repeated on several different solenoids or other electrical components to obtain data thereon for use in the resistance versus temperature operation which follows.

In determining the temperature increase of electrical components during the operation thereof, it is desirable to utilize the full recording scale of the recorder 16 in order to accurately determine resistance-temperature increases therein during transient current flow therethrough produced under operating conditions. A chart of such transient conditions is shown in FIGURE 1 which includes a temperature versus elapsed time chart having a curve 100 thereon that has an ambient temperature point 102 thereon and a second curve 104 showing the stabilized operating temperatures of the load. It will be noted that in the chart of FIGURE 1 the resistance temperature read out is continuous throughout the energization of the load under operating conditions. The advantage of such a continually recorded indication of the temperature of the load is apparent in that it gives an accurate, clear designation of the actual temperature conditions of the load throughout its operation.

In accordance with certain of the principles of the present invention, following the resistance checking test the resistance value of the load at ambient is utilized to establish an output signal from the meter that locates the trace on the recorder at or near one edge of the full scale thereof, to the right as seen in FIGURE 1. In the circuit of FIGURES 4 and 5 this operation is carried out by first setting the function switch 34 to a recorder calibrating position which causes each of the switching components 34a through 34f to be rotated clockwise one position from the position at which they were under the bridge testing operation. This disconnects the resistance bridge testing circuit previously described from the DC source 86 and connects the resistance bank 66, resistance bank or multiplier decade 94 and power source 86 into a circuit including a divider decade 106 and a zero adjustment circuit 108 across the output jacks 26 for establishing the limits of the output signal therefrom.

As best seen in FIGURES 4 and 5, the calibrating circuit for determining the limits of the output signal from the jacks 26 to the recorder 16 so as to utilize the full scale thereof runs from the positive jack of the output jacks 26 through switching component 34a and thence through a conductor 110 to the input terminal of the resistance bank represented by the voltage divider 106. The circuit is divided at this point to pass through one branch including the divider decade 106 and a conductor 112 to a conductor 114 to the zero adjust circuit 108 and through another branch including a conductor 116 and a conductor 118 through a closed solenoid actuated switch 120 thence through another plural contact switch component 34g of the function switch through a conductor 122 to conductor 90 which has a normally closed calibrating check switch 122 therein connected through a conductor 124 through a closed switch 126 for bypassing a plus resistance 127 in the resistance bank 66 thence through the preset resistances in the bank 66a representing the resistance value of the load at ambient. In the control circuitry like plus resistances designated 127b, 127c, 127d are included in the percentage decades, respectively. Each of these resistances are by-passed by switches 126b, 126c and 126d, respectively, with the positioning of all the by-pass switches being controlled by the manually actuatable switch knob 46 on the console.

The calibrating circuit then passes through conductor 68 and the switch 34d across the DC power source 86 and through the switching component 34c and thence through a conductor 128 connected to a switch 130 for by-passing a plus resistance 131 in the multiplier decade 94. The plus resistance 131 is also controlled by the control knob 46.

The calibrating circuit then is connected through the previously set resistance of the decade 94 thence through the conductor 114 to the zero adjust circuit 108 and thence back to the negative jack of the output jacks 26 through a conductor 132 and the switching component 34f. The circuit also includes a capacitive filter 133 across the jacks 26.

Referring more particularly to the zero adjust circuit 108, it is seen that it includes a potentiometer 134 that is adjustable to vary the effect of a parallel buck bias DC power source 135 connected across the potentiometer by a plural contact switching component 36a of the temperature selector switch 36 on the console 20 thence through one of a plurality of resistances in a resistance bank 136 which is connected to a conductor 137 through the power source 135 and thence through a plural contact switching component 34h of the function switch 34 and a conductor 138 to the conductor 132. The conductor 132 is connected through one resistance in a resistance bank 140 and thence through a plural contact switching component 36b of the temperature selector switch 36.

As best seen in the block diagram of FIGURE 3, when the temperature selector switch 36 is positioned as shown in FIGURE 4, the output signal across jacks 26 is dependent upon the resistance values of the decade 66a, the resistance of the multiplier decade 94, the resistance of the voltage divider decade bank 106 and the resistance within the zero adjust circuit 108.

During calibration the output signal is first conditioned by adjustment of the resistance of the voltage divider decade 106 until the output signal across jacks 26 causes the recorder 16 to trace a record near the high end of its temperature scale, to the left of the scale shown in FIGURE 1. Then the zero adjust knob 39 is manually positioned to adjust the potentiometer 134 of the zero adjust circuit 108 to closely adjust the trace of the output signal to the reference or base temperature point on the scale of the recorder.

In order to set the upper limit of the temperature range established by the signal output across the jacks 26, the effect of the divider 106 in the circuit is bucked out by changing the effect of power source 135 in the calibration circuit through adjusting the potentiometer 134 and a resistance is included in the above-described calibration circuit to establish a desired percentage resistance increase that is to be expected during the operation of the load. This value is determined by knowledge of the general operating characteristics of the load. For example, in some cases, an operating solenoid valve may have an expected 80% increase in resistance therein due to temperature increase by self-heating which corresponds to an upper temperature limit of 220° C. in the illustrated embodiment of the invention where the lower temperature or ambient limit is at 20° C. In this case, the additional resistance included in the calibrating circuit is 80% of the value of the ambient resistance of the load.

More particularly, to add the resistance in the calibration circuit by using the improved meter 10, an operator sets the temperature scale 36 as shown in the drawings whereby the plural switching components 36a, 36b are positioned as illustrated in FIGURE 4 and another plural switch component 36c shown in FIGURE 5 is positioned to connect the resistance of the percentage decade 66b in the circuit. Thus, when the calibration check switch 122 is opened, the added resistance of the percentage decade 66b will decrease the voltage of the output signal across the output jacks 26 to cause the recorder 16 to scan toward the maximum temperature side of the chart shown in FIGURE 1. In running an expansion test of the trace on the chart of the recorder 16 by opening the calibration check switch 122, it may be necessary to readjust the resistance value of the voltage divider decade 106 to properly spread the recording scale completely across the chart. In this case, the low tempertaure adjustment previously made can be slightly thrown out of adjustment. This is determined by closing the calibrating check switch 122 and observing where the recorder trace returns toward the low temperature point on the chart. If necessary, the low temperature point is readjusted to correspond to the base line point on the chart. Then the switch 122 is reopened to check the position of the upper temperature recording on the chart. Eventually, following a few trial and error adjustment steps identical to those set forth above, the output signal is established to fully utilize the chart when the circuitry of the metering device 10 is testing the temperature increase of an electrical component under actual operating conditions.

Once the particular load has been calibrated to utilize the full scale of the recorder 16, the testing operation is commenced. In this case, the function switch 34 is moved to an operate position which conditions the circuit in FIGURES 4 and 5 to complete an AC power supply circuit for the load across the input jacks 32 and to complete a testing circuit across the output terminals 26 of the previously calibrated meter. More particularly, when the function switch 34 is moved to its operate position and the power supply to the recorder is turned on, a coil 141 is energized off the power supply to the recorder through leads 142 connected to the power supply and the switching component 34g is moved to its most clockwise position. Energization of the coil 141 moves the switch 120 and a switch 146 to complete a load energization circuit across the AC power supply from the jack 25 connected to L₁ through a conductor 148 thence through the switch 120, conductor 118 across a particular one of the capacitors in the blocking capacitor switch bank 60 depending upon the type of load being tested. The selected capacitor is connected through conductor 80, a conductor 150, switch 146, a conductor 152 to the load across the terminal jacks 32, thence through conductor 90 back through conductors 122, 144 to the jack 25 connected to line N of the power supply. The selection of a particular capacitor to serve as a means for blocking the AC power supply from the DC testing circuit is such that the voltage drop across the blocking capacitor is held within a relatively low value in the order of one-half volt for a 110-volt power supply whereby the load is energized substantially at line voltage to produce an accurate temperature check thereof under operating conditions.

Continuing to assume that the load is a solenoid valve, the temperature of the wiring therein will begin to increase immediately following the movement of the function switch 34 to its operate position. The energized AC load across input jacks 30 is also included in a DC testing circuit that is blocked from the AC power circuit by the selected capacitor in the capacitor bank 60. The DC testing circuit runs from the positive jack of the output jacks 26 through switching component 34a, thence through conductor 110, through the resistance selected on the divider decade 106 thence through the conductors 112, 114 to the zero adjust circuit 108. The circuit also runs through branch conductor 116 through conductor 118, the solenoid switch 120 and thence through a reactor 156 that serves to complete the DC testing circuit and provide a stable low-resistance path. The reactor 156 is connected through the conductor 144, conductor 122 and conductor 90 across the load being tested so that changes in resistance thereof will produce a voltage change across the output terminals 26 as the resistance of the load changes from its ambient resistance.

The testing circuit is connected from the load through conductors 88 and 152, switch 146 and conductor 150 to conductors 80, 82 and across the power supply 86 which is connected between conductor 82 and conductors 128 by switching components 34c, 34d of the function switch when it is in its operate position. The function switch thereby eliminates the resistance of the resistance block 66 from the instrument during its operating or testing phase of operation. From the conductor 128, the DC testing circuit passes through the resistance values automatically selected on the multiplier decade or resistance bank 94 during the initial bridge testing operation of the resistance of the load and thence through conductor 114 back to the zero adjust circuit 108 and thence through conductor 132 and switch component 34f to the negative jack of the output signal jack pair. As the resistance of the operating load changes from ambient, the DC testing circuit across the terminals produces a varying output signal which then drives the tracing equipment in recorder 16 to show even very transient temperature changes in the load.

In view of the aforesaid remarks, it will be seen by those skilled in the art that a multiple function resistance versus temperature instrument is disclosed that is capable of producing a continuous signal corresponding to changes in resistance of a load operating under particular conditions which utilizes the full scale of a recording instrument to plot an indication of this resistance temperature change. The meter or instrument is capable of simultaneously determining the resistance of a load at ambient conditions while conditioning an instrument calibrating circuit to match the signal output from the instrument to a particular load being tested. The instrument in particular is characterized by the use of various components therein as part of each of the bridge, calibrate and testing circuits whereby the multi-purpose instrument is commensurately reduced in cost of manufacture.

While the embodiments of the present invention as herein disclosed constitute preferred forms, it is to be understood that other forms might be adopted.

What is claimed is as follows:

1. In a resistance metering device for continuously indicating the resistance of a load such as wiring in an electrical component energized under operating conditions for indicating temperature increases therein by electrical self-heating, the combination of, a power circuit for energizing the load to be tested, a testing circuit having a direct-current source of power and means operative to produce a continuous output signal indicating temperature increase of the load, capacitor means electrically connected to said power circuit and said testing circuit for isolating the testing circuit from the power circuit, bridge means for determining the resistance of the load under ambient conditions, sequence switch means for connecting the load in said bridge means, said sequence switch means connecting the load simultaneously in said power and testing circuit while disconnecting the load from said bridge means, a resistance multiplier in said testing circuit set by adjustment of said bridge means to a multiple of the ambient resistance of the load, a voltage divider resistance and a buck biasing circuit electrically connected to said resistance multiplier and said direct-current source of power to establish an output signal range in accordance with the type of load being tested.

2. In a resistance meter for testing resistance changes in an electrical load such as wiring of an electrical component produced by temperature increases therein through electrical self-heating under operating conditions, the combination of, bridge circuit means including plural legs and a direct-current source of power, first variable resistance means in one of said legs, an electrical load to be tested in another of said legs, said bridge circuit means including output terminals, said first variable resistance means being adjustable to balance an output signal across said output terminals for determining the ambient resistance of said load, second variable resistance means, means connected to said first variable resistance means for adjusting said second variable resistance means to a multiple of said first variable resistance means during bridge balancing, a power circuit sequence switch means to disconnect said load from said bridge circuit means and into said power circuit for energizing said load, testing circuit means including said second variable resistance means for determining resistance changes in said load, said sequence switch means including said load in said testing circuit means during energization of said load by said power circuit, said sequence switch means for disconnecting said first variable resistance means from said testing circuit when said load is included in said power circuit.

3. In the combination of claim 2, said testing circuit including third variable resistance means adjustable to modulate an output signal from said testing circuit in accordance with the resistance of the load being tested.

4. In a resistance meter for testing resistance changes in an electrical load such as wiring of an electrical component produced by temperature increases therein through electrical self-heating under operating conditions, the combination of, bridge circuit means including plural legs and a direct-current source of power, first variable resistance means in one of said legs, an electrical load to be tested in another of said legs, said bridge circuit means including output terminals, said first variable resistance means being adjustable to balance an output signal across said output terminals for determining the ambient resistance of said load, second variable resistance means, means connected to said first variable resistance means for adjusting said second variable resistance means to a multiple of said first variable resistance means during bridge balancing, a power circuit, sequential switch means to disconnect said load from said bridge circuit means into said power circuit for energizing said load, testing circuit means including said second variable resistance means, said sequence switch means including said load in said testing circuit simultaneously with energization of said load in said power circuit, said sequence switch means disconnecting said first variable resistance means from said testing circuit when said switch means connects said power circuit to said load, means for electrically isolating said power circuit from said testing circuit, said testing circuit including output terminal means, and a continuous recording device for receiving an output signal across said testing circuit output terminals for continuously indicating the changes in resistance of said DC load.

5. In the combination of claim 4, said testing circuit including third variable resistance means adjustable to modulate the output signal from said testing circuit in accordance with the resistance of the load being tested for producing an output signal of a magnitude to fully utilize the recording scale of said continuous recording device.

6. In a resistance meter for testing resistance changes in the wiring of an electrical component produced by temperature increases therein through electrical self-heating under operating conditions, the combination of, bridge circuit means including a direct-current source of power and balancing means for establishing the ambient resistance of a load to be tested, a variable resistance means, adjusting means operative during bridge balancing to set said variable resistance means at a multiple resistance value of the ambient resistance of the load to be tested, calibrating circuit means, sequential switch means for including said variable resistance means in said calibrating circuit means and disconnecting it from said bridge circuit means, said calibrating circuit means including a first resistance equal to the ambient resistance of the load to be tested and a second resistance of a predetermined percentage value of the ambient resistance, said calibrating circuit means having a direct-current source of power electrically connected to said first and second resistances, said calibrating circuit including a pair of output terminals connected across said first and second resistances and said direct-current power source, a voltage divider resistance connected between one of said terminals and the other of said terminals adjustable to vary a signal produced by said first and second resistances across the output terminals of said calibrating circuit means, bias circuit means in said calibrating circuit means connected between the other of said terminals and said direct-current source of power for varying the effect of said direct-current source of power to establish a zero signal output, and calibrating switch means operative to selectively connect and disconnect said second resistance in said calibrating circuit means to determine an output signal limit reflecting an upper temperature increase in the load to be tested, said voltage divider resistance being adjustable to establish another signal output limit to correlate the signal range across said output terminals to the type of load being tested.

7. In a testing system for continuously indicating resistance changes in an electrical load such as the wiring of an electrical component produced by temperature increases therein through electrical self-heating under operating conditions, the combination of, bridge circuit means including a direct-current source of power and balancing means for establishing the ambient resistance of a load to be tested, a variable resistance means, adjusting means operative during bridge balancing to set said variable resistance means at a multiple resistance value of the ambient resistance of the load to be tested, calibrating circuit means including said variable resistance, a first resistance equal to the ambient resistance of the load to be tested and a second resistance of a predetermined percentage value of the ambient resistance electrically connected to said first resistance, sequence switch means for disconnecting said direct-current source of power and said load from said bridge means while electrically connecting said direct-current source of power and said load with said first and second resistances, said calibrating circuit means including a pair of output terminals connected across said first and second resistances and said direct-current power source, a voltage divider resistance connected between one of said terminals and the other of said terminals adjustable to vary a signal produced by said first and second resistances across the output terminals of said calibrating circuit means, bias circuit means in said calibrating circuit means connecting another of said terminals and said direct-current source of power for varying the effect of said source of power to establish a zero signal output, calibrating check switch means selectively including said second resistance in said calibrating circuit to determine an output signal limit reflecting an upper temperature increase in the load to be tested, said voltage divider resistance being adjustable to establish another output limit to correlate the signal output range to the type of load being tested, said sequence switch means disconnecting said first and second resistances from said calibrating circuit means to define a testing circuit, a power circuit for energizing said load, said sequence switch means simultaneously connecting a load to be tested in said power and testing circuit for producing a signal across said output terminals reflecting the resistance change in said load.

References Cited

UNITED STATES PATENTS

| | | | |
|---|---|---|---|
| 2,825,027 | 2/1958 | Seely | 324—62 |
| 2,912,644 | 11/1959 | Makous | 324—62 |
| 3,175,206 | 3/1965 | Lindberg et al. | 324—62 XR |
| 3,207,980 | 9/1965 | Shockroo et al. | 324—62 |
| 3,210,657 | 10/1965 | Flanagan | 324—62 |

FOREIGN PATENTS

| | | |
|---|---|---|
| 842,003 | 7/1960 | Great Britain. |

RUDOLPH V. ROLINEC, *Primary Examiner.*

E. E. KUBASIEWICZ, *Assistant Examiner.*